No. 705,350. Patented July 22, 1902.
P. G. HUBERT.
SOLAR HEATER.
(Application filed Sept. 24, 1901.)
(No Model.)

Witnesses:-
George Barry Jr.
Henry Thieme

Inventor:-
Philip G. Hubert
By Brown & Seward
his Attorneys

UNITED STATES PATENT OFFICE.

PHILIP G. HUBERT, OF NEW YORK, N. Y.

SOLAR HEATER.

SPECIFICATION forming part of Letters Patent No. 705,350, dated July 22, 1902.

Application filed September 24, 1901. Serial No. 76,422. (No model.)

*To all whom it may concern:*

Be it known that I, PHILIP G. HUBERT, a citizen of the United States, and a resident of the borough of Manhattan, in the city and State of New York, have invented a new and useful Solar Heater, of which the following is a specification.

My invention relates to a solar heater for use in connection with a tank of liquid—water, for example—the object being to provide a heater for general household use to keep a body of heated water on hand.

A practical embodiment of my invention is represented in the accompanying drawings, in which—

Figure 1:
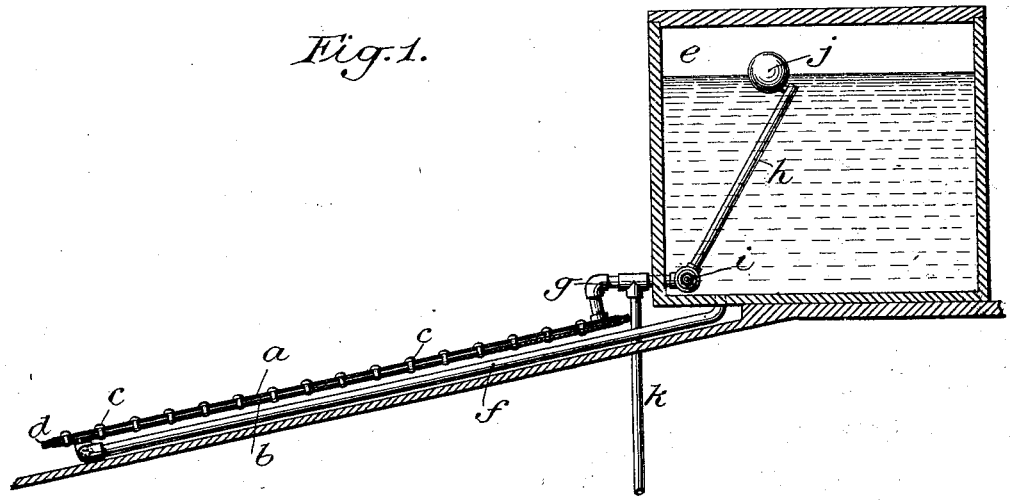
Figure 2:
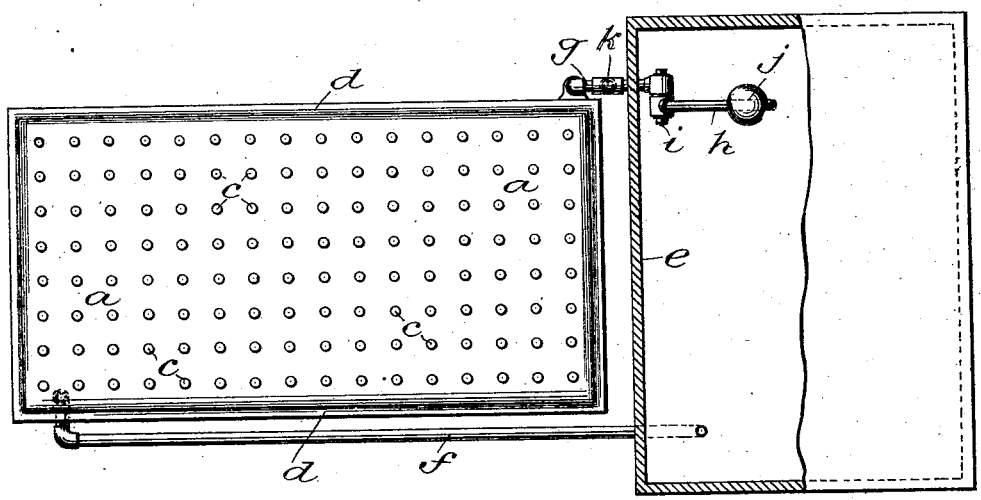

Figure 1 is a view of the heater and tank in vertical longitudinal section, and Fig. 2 is a plan view.

The heater comprises an upper and a lower plate (denoted, respectively, by *a* and *b*) of some suitable material for absorbing the heat of the sun's rays—as, for example, copper or sheet-iron. The plates *a* and *b* are spaced a slight distance apart, a distance so slight that the two plates form a flat capillary tube for spreading the water to be heated in a thin film between the plates. The plates *a* and *b* are united throughout their faces by rivets *c*, placed at frequent intervals and which serve to conduct the heat absorbed by the upper plate *a* through the thin film of water to the plate *b*, keeping the two plates heated, and thereby heating the film of water from both the upper and lower sides. The plates *a* and *b* are united at their edges by a rim *d*, making the space between the plates an inclosed space. The tank for maintaining the supply of hot water is denoted by *e*. A pipe *f* leads from the tank *e*, from a point at or near its bottom, to the lower corner of the heater formed by the plates *a b* and rim *d*, which heater is intended to be set in an inclined position facing the sun to take its rays directly on its face. The upper opposite corner of the heater is connected with the tank by a pipe *g*, leading to a point at or near the bottom of the tank, and is connected within the tank with a pipe *h*, hinged to the pipe *g* at *i*, its free end being suspended within the tank by a float *j*, so that the warm water at the surface within the tank may be drawn upon.

The outlet-pipe is denoted by *k*. It is connected with the pipe *g* at a point near the bottom of the tank and will therefore supply warm water either directly from the heater or from the upper stratum of water within the tank.

It is intended that the space within the heater shall be a little greater than the capacity of the pipes leading from and to the tank, so that the stream of water flowing from the tank and spread out in a broad thin film to be heated on its return to the tank will not be to any great extent impeded in its movement from and to the tank. The circulation is kept up by gravity induced by the heated water in the heater, and it is intended that the pipes and tank shall be so packed as to retain the heat.

In practice I have succeeded in heating the water in the tank to 144° Fahrenheit, and it has fallen by 10° Fahrenheit during the night.

The heater is simple, effective, and may be furnished at a comparatively slight cost.

It is obvious that slight changes might be resorted to in the form and arrangement of the several parts without departing from the spirit and scope of my invention. Hence I do not wish to limit myself strictly to the structure herein shown and described; but

What I claim is—

A solar heater comprising a broad thin heating-chamber having its top and bottom plates so spaced as to spread the water therein into a thin film, thereby causing the entire amount of water to come into close proximity to the one or the other of the plates, a tank, a pipe leading from the lower portion of the tank to the heating-chamber, a pipe leading from the heating-chamber to the upper portion of the liquid in the tank, and a draw-off pipe connected with the pipe leading from the heating-chamber to the tank, the said pipe leading from the heating-chamber to the tank being provided with a swing-section supported by a float within the tank.

In testimony that I claim the foregoing as my invention I have signed my name, in presence of two witnesses, this 21st day of September, 1901.

PHILIP G. HUBERT.

Witnesses:
FREDK. HAYNES,
C. S. SUNDGREN.